July 7, 1959  J. B. DAVIDSON  2,893,167
COLLAPSIBLE PLANT CONTAINER
Filed Aug. 17, 1956

*INVENTOR.*
JOE B. DAVIDSON
BY Thomas Scott MacDonald
ATTORNEY

United States Patent Office 2,893,167
Patented July 7, 1959

2,893,167

COLLAPSIBLE PLANT CONTAINER

Joe B. Davidson, Garden Grove, Calif.

Application August 17, 1956, Serial No. 604,701

2 Claims. (Cl. 47—37)

The present invention is directed to a collapsible container. More specifically the invention concerns a collapsible container particularly adapted for holding and removing a growing-plant earth ball.

Heretofore, various type containers have been proposed for holding growing plants and other objects. Generally, nursery plants are potted in earthenware pots or in tin cans, both of which present problems in the subsequent removal of the plant and its earth ball from the container. In the case of the widely used cylindrical can container the sides of the can must be either split by the nurseryman thus damaging the root system and exposing root ends to drying conditions until the plant is replanted or it must be split by the homeowner usually without the proper tools with attendant plant damage. Obviously, such containers are not capable of reuse. Earthenware pots, while ordinarily reusable, are easily broken both in use and storage and much difficulty is had in removing an earth ball therefrom for transplanting or the like.

The present collapsible container in the case of its prime use as a plant container is characterized by the ease of transplanting plants potted in such container, by its cheapness, unbreakability and reusability. The pot of this invention is moreover easy to store, is ornamental and colorful, and is extremely safe to use. The essence of the present invention is a pot comprising a series of discrete sections slidable over each other into a collapsible position allowing free access to a planar shelf on the top of a lower discrete section.

An object of this invention is to provide a collapsible container.

A further object of this invention is to provide a collapsible plant container.

A still further object of this invention is to provide a plant container characterized by the ease of removing a plant earth ball therefrom.

An additional object of this invention is to provide a container including an article-holding shelf elevated from the base supporting surface thereof.

The above objects as well as other objects of this invention will become apparent from the following description and accompanying drawings in which.

Figure 1:
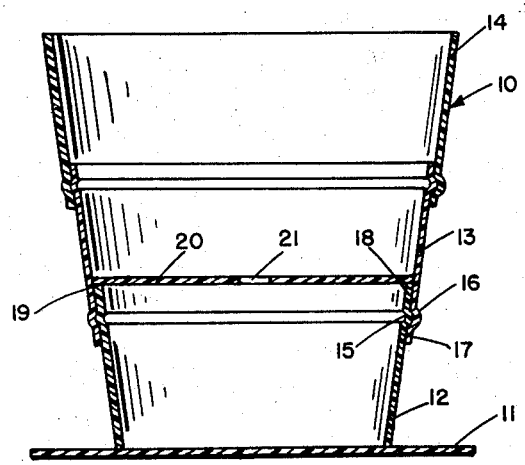
Figure 1 is a cross-sectional view of the container in extended position.
Figure 3:
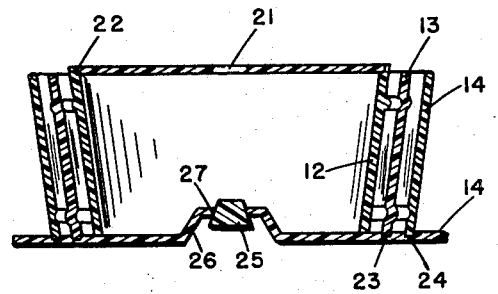
Figure 3 is a cross-sectional view of a modified form of container in a collapsed position.

In Figure 1 a base portion 11 is provided for the overall container 10. A first cup section 12 is formed upstanding from the base 11 and generally comprises upwardly and outwardly tapered side walls. The side walls may be made integral with the base 11 by a molding step or may be attached as by gluing preferably with a moisture resistant adhesive. A shelf 20 is provided across the top of section 12 on which the plant earth ball or other object is placed. This shelf 20 may be adhesively bonded to the section 12 as the base portion 11. The combination of the base portion 11, the section 12 and the plant-holding shelf 20 forms a hollow bottom section. A second discrete upstanding section 13 is provided slidably mounted on the exterior periphery of the first section 12. The side walls of section 13 are parallel to the side walls of section 12 and have a corresponding taper. While in some applications this will complete the container in height, it is preferred that at least one more section 14 be provided slidable over section 13 as that section 13 is slidable over section 12. Means is provided to lock the various sections together in an extended position. In Figure 1 this means comprises cooperating annular ridges 15 and channels 16 adjacent the top edge of section 12, adjacent the top and bottom edges of section 13 and adjacent the bottom edge of the last section, such as section 14. Any intermediate or extra section will ordinarily have grooves and ridges as in section 13. Sufficient flexibility is provided in the annular container sections so that the ridges will snap into the grooves as the sections are extended into position. It is to be noted that the ridges and grooves may be channels as shown (Figure 1), or may be annular bulges or depressions on stock of constant or variable thickness (Figure 3). The locking means disclosed above further functions as a positive water or liquid seal for the container. Sufficient overlap, as at 17 and 18, must be provided at the junctions of the interfitting sections to insure a sound joint. If necessary, the bottom edges of sections 13 and/or 14 may be split to facilitate the locking of the parts.

In operation, the various sections are expanded and the volume above the shelf 20 is filled with the plant mix or other solid-like material. Drainage means generally in the form of an aperture 21 is provided through the planiform plant-holding shelf. The inner surface of the annular sections in contact with the earth ball is smooth so that sticking of earth or roots is minimized.

Figure 2:
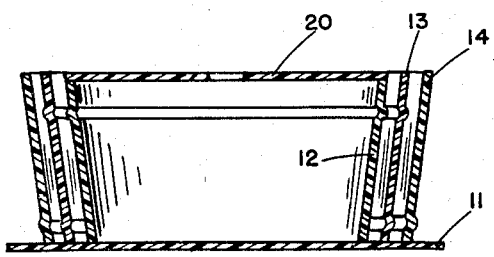
Figure 2 is a cross-sectional view of the container in collapsed position.

Figure 2 shows the device in collapsed position. The outer sections 14 and 13 are pushed downwardly with sufficient force to disengage the locking means. The bottom edges of sections 13 and 14 abut the top surface of base portion 11 in the collapsed position. The height of the sections or section exterior of the first section 11 is limited by the height of the top surface of the plane shelf 20 above the top surface of base portion 11 in order to provide free access to the shelf. By free access is meant an orientation allowing the earth ball or other material to be easily slid off the shelf 20 without interference from the outer peripheral sections. As the sections 14 and 13 are slid down there is no disturbance or cutting of the roots as in the prior art metal cans. Further, the outer top edges of the lower sections act initially to scrape the inside of the next upper section as that section is pushed down. Sufficient taper is provided in the various sections to insure ease of opening and closing the collapsible container. Tapering also acts to cut down the amount of mix or material necessary to fill the container. It can be seen that the container of this invention may be any shape in top section, such as circular, square or oval. The total number and size of annular sections is optional and may be varied dependent on the desired usable pot volume.

Figure 3 is a modified form of container in which the shelf 20 is snapped into a lip portion 22 extending on the upper inner periphery of section 12. The drain aperture 21 serves also as a finger hold for removing the shelf when desired. The base portion 11 is provided with means forming a closable port on its lower surface to provide for access into section 12. This means comprises a reentrant cavity 26 having an aperture or port 27 adapted to be closed by a plug 25. The port means is usable in cleaning the hollow section to insure a sweet pot without mildew. A plant-watering wick may also be provided in the hollow section and access had through port 27 for filling the section with water. Annular retaining grooves 23 and 24 are provided on the top surface of base portion 11 for the receipt of the lower edges of sections 13 and 14, respectively, to prevent shaking of the outer sections in the collapsed position. The top edges of the various annular sections may be scalloped or otherwise decorated if desired.

Typically, the annular sections and other ports of the container are made of a semi-flexible plastic material, such as polyethylene, plasticized polystyrene or melamine resin. A variety of colors can be provided for individual containers or sections. For larger sizes particularly, metal annular sections may be provided.

A reusable and/or returnable collapsible container has been described above, particularly with respect to its function of permitting easy transplanting of plants growing in such container.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A plant container comprising a generally flat base portion, an upstanding hollow section extending from said base portion inwardly of the periphery thereof, a series of concentric plant-holding upstanding sections, each approximately the height of said hollow section, an inner section of said series slidably mounted on the exterior periphery of said hollow section, the remainder of said series of sections slidably mounted on the exterior periphery of inner sections of said series, and a plant-holding plane shelf extending flush across and fixedly held on the top of said hollow section, said series of sections being adapted to slide down over said hollow section giving free access to said plane shelf for easy removal of a plant root ball therefrom.

2. A collapsible plant container comprising a flat base portion, a first cup section having outwardly and upwardly tapered side walls attached to said base portion, a series of concentric interfitting, flexible plastic annular sections having correspondingly tapered walls, each of a height approximating the height of said cup section, an inner section of said series slidably mounted on the exterior periphery of said first cup section, the remainder of said series of sections slidably mounted on the exterior periphery of inner sections of said series, cooperating interlocking annular ridges and channels adjacent top and bottom edges of said annular sections to lock said first cup section and said series of annular sections in extended position, and a fixedly secured plant-holding bottom shelf mounted substantially flush across the top of said first cup section, said interfitting annular sections being slidable down over said cup section to allow for easy removal of an earth ball in said container.

References Cited in the file of this patent
UNITED STATES PATENTS

| | | |
|---|---|---|
| 54,817 | Howarth | May 15, 1866 |
| 750,632 | Fisher | Jan. 26, 1904 |
| 879,753 | Eckert | Feb. 18, 1908 |
| 1,035,561 | Felty | Aug. 13, 1912 |
| 1,093,873 | Mitchell | Apr. 21, 1914 |
| 1,376,117 | Sandor | Apr. 26, 1921 |

FOREIGN PATENTS

| | | |
|---|---|---|
| 4,908 | Great Britain | Mar. 28, 1890 |
| 103,286 | Sweden | Dec. 12, 1941 |